United States Patent

[11] 3,587,324

| [72] | Inventors | William J. Bandy, Jr.; |
| | | Robert L. Sell, Akron, Ohio |
| [21] | Appl. No. | 799,420 |
| [22] | Filed | Feb. 14, 1969 |
| [45] | Patented | June 28, 1971 |
| [73] | Assignee | Karl R. Rohrer Associates, |
| | | Akron, Ohio |

[54] SAMPLING DEVICE
7 Claims, 2 Drawing Figs.

| [52] | U.S. Cl. | 73/423, 73/423 |
| [51] | Int. Cl. | G01n 1/10 |
| [50] | Field of Search | 73/421 (A), 422, 422 (TC), 423, 424, 423 (A) |

[56] References Cited
UNITED STATES PATENTS

| 1,146,402 | 7/1915 | Chambers | 73/421UX |
| 1,642,337 | 9/1927 | Gray et al. | 73/423 |
| 2,349,403 | 5/1944 | Bertetti | 73/422 |
| 2,792,836 | 5/1957 | Reynolds, Jr. et al. | 73/424X |
| 3,122,019 | 1/1964 | Wellemius et al. | 73/423 |

*Primary Examiner*—S. Clement Swisher
*Assistant Examiner*—Daniel M. Yasich
*Attorney*—Freeman and Taylor ABSTRACT: A sampling device adapted to take predetermined amounts of liquid from a conduit for testing purposes. The sampler will automatically take, at set time intervals, an individual sample from the flow and is also adapted to take a composite sample proportionate to the total flow with this second sample being taken in response to the volume of flow through the conduit.

INVENTORS
WILLIAM J. BANDY JR. &
BY ROBERT L. SELL
Freeman & Taylor
ATTORNEYS

SAMPLING DEVICE

SAMPLING DEVICE

This invention resulted from work done under Contract No. 14-12-with Federal Water Pollution Control Administration in the Department of the Interior and is subject to the terms and provisions of the President's Patent Policy Statement of Oct. 10, 1963, 28 F.R. 10943.

RELATED APPLICATIONS

None.

BACKGROUND OF THE INVENTION

This invention in general relates to mechanical sampling devices adapted to automatically take samples from a fluid flow and has particular relation to taking test samples from the storm sewer overflow from a combined sewer although the sampler will also have equal utility in any instance in which samples are required for testing purposes.

DESCRIPTION OF THE PRIOR ART

The following prior art is known to applicant:
Chambers, U.S. Pat. No. 1,146,402, Harper, U.S. Pat. No. 2,422,352, Honstead, U.S. Pat. No. 2,800,797, Wellenius et al., U.S. Pat. No. 3,122,019, Berg, U.S. Pat. No. 3,153,345, Johnson et al., U.S. Pat. No. 3,362,222.

Each of these patents except the Harper reference disclose liquid sampling apparatus.

However, none of these references disclose structure which permits a simultaneous taking of discrete samples and a composite sample as well.

Furthermore, none of these references disclose the simple automatic operation achieved by the specific structure set forth in this application.

SUMMARY OF THE INVENTION

In many instances it is desirable to obtain samples of liquid flow from a conduit or pipe for the purpose of testing the same. One specific situation in which such a structure is desirable is with relation to taking test samples from storm overflows from a combined sewer.

It has been discovered that individual samples at predetermined time intervals can be obtained by providing a tiltable funnel which in the normal instance permits the liquid to flow through the piping but which at certain predetermined time intervals can be tilted so as to divert the flow into individual sampling containers.

It has been found that by utilization of a cam and mechanical linkage and by placing the individual sampling containers on a turntable that the samples can be taken at predetermined times and in predetermined amounts during flow.

It has further been found that by providing a second and larger sample container and a second pivotable funnel that a composite sample can be taken based upon the volume of flow. This sampler is operated by a flow meter placed in the conduit which will send a signal to a solenoid after a certain volume of liquid has passed through the conduit. The solenoid will then tilt the funnel to divert a fixed amount of the liquid into the second or composite sampling container and once the flow meter has sensed a given volume passing through the conduit, the solenoid will be deactivated to permit the funnel to be returned to its upright position thereby permitting the flow to again pass through the device without interruption.

It has been found that both of these samplers can be incorporated into one structural unit and operated by means of a single pump.

Accordingly, production of an improved sampling device of the type described becomes the principal object of this invention with other objects thereof becoming more apparent upon a reading of the following brief specification considered and interpreted in view of the accompanying drawings.

OF THE DRAWINGS

Figure 1:
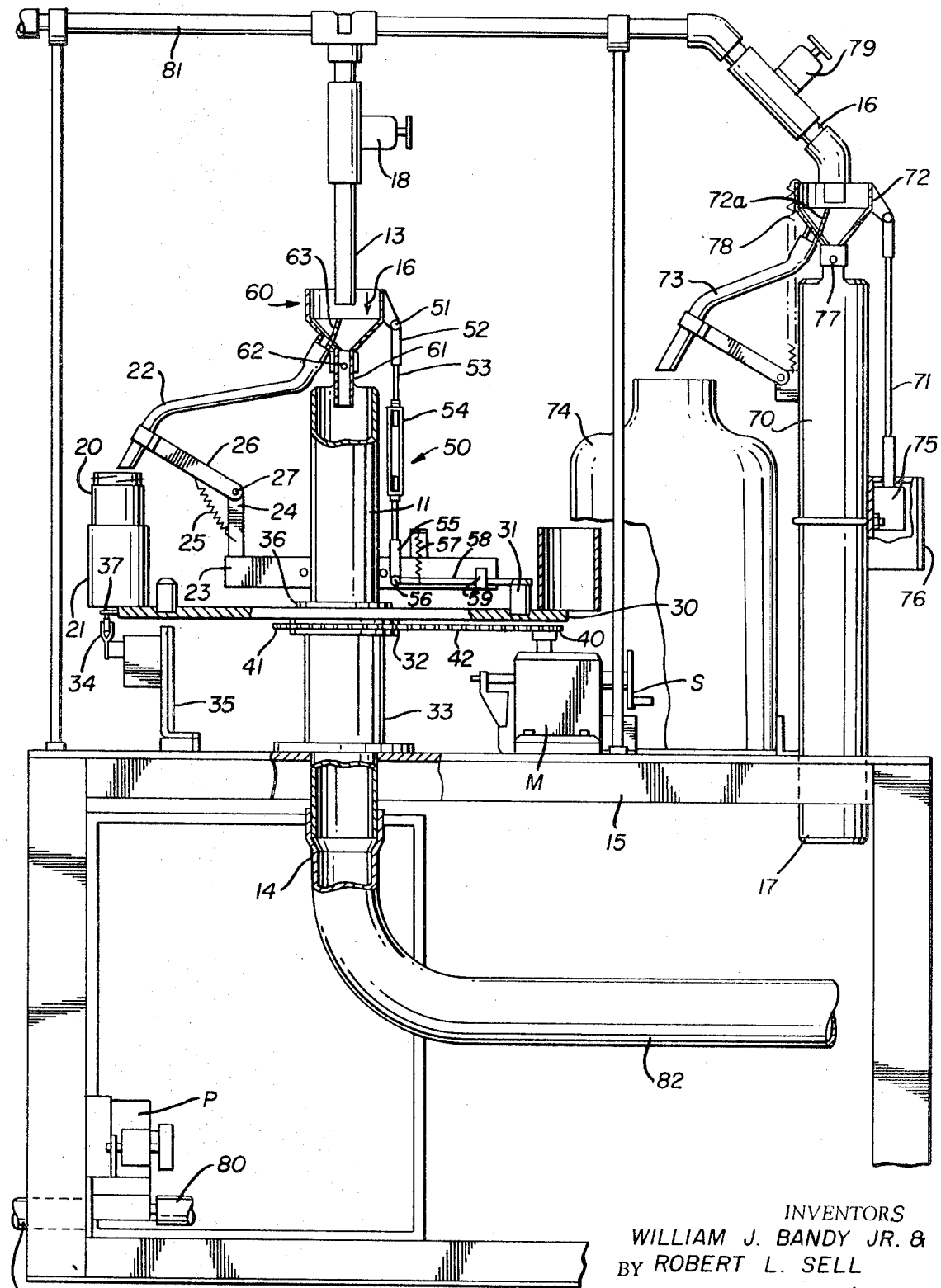
FIG. 1 is an elevational view of the improved sampling device partially broken away in section.
Figure 2:
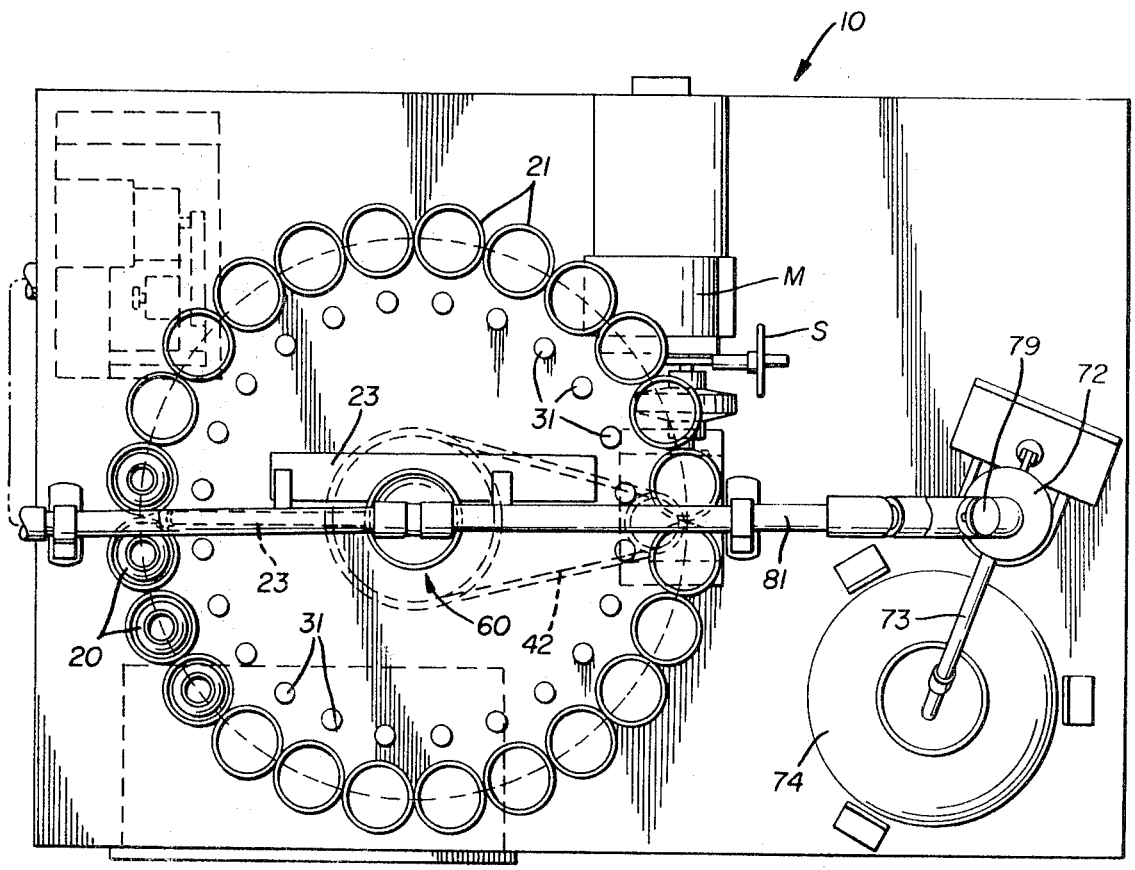
FIG. 2 is a top plan view of the improved sampler.

Considering first the principal components of the sampling device 10, it will be seen that the same include a stand or support 15 upon which is mounted a motor M and a pump P. The device also includes tubes 11 and 70 which act in concert with the separate sample taking members one of which is the series of jars 20,20 intended to take the individual samples and the other of which is the jar 74 intended to take the composite sample.

Before examining the structure of the sampler in detail, a brief description of the path of flow is believed pertinent. The liquid flow will enter into the sampling system through the line 80 which comes from the sewer or other source of liquid supply. Line 80 feeds into the pump P which is a conventional diaphragm pump enabling it to pass the solids contained in the liquid on into the sampling system substantially as they came from the sewer. The line 81 carries the liquid from the pump to the various sampling elements as will now be described. Thus line 81 passes up over the first sampler and a portion of the flow will be diverted into the tube 11 by means of the conduit 13.

Conduit 81 also passes over the second sampler and dumps a portion of the flow into the tube 70 through the conduit 16.

When no samples are being taken, the liquid will flow through tubes 11 and 70 and out through conduits 14 and 17 into a larger conduit 82 which leads back into the sewer.

Throttle valves 18 and 79 are associated with the respective samplers to provide a means for controlling the flow if necessary.

Considering next then the structure necessary to take the individual samples, it will be noted that the tube 11 is mounted on the stand 15 with the conduit 13 permitting liquid flow through the funnel 60 into the tube 11 and on out through the conduit 14 in the normal instance. Mounted about the tube 11 is a support disc or turntable 30 which is mounted on the tube in conventional fashion by means of the sleeve 33, bearing 32 and bushing 36 so that the disc 30 can rotate about the tube 11.

Also mounted on the bearing 32 is a sprocket 41 which is connected by means of a chain 42 to another sprocket 40. The sprocket 40 is mounted in conventional fashion on the motor M so that upon activation of the motor the sprocket 40, chain 42 and sprocket 41 will rotate the disc 30. A speed control S is also provided to control the rotation rate of disc 30.

Mounted on the top surface of the disc 30 are a series of cams 31,31 and a series of jar support members 21,21. The jar support members 21,21 are designed to receive a plurality of jars 20,20 into which the individual samples are dumped upon activation of the sampler.

Considering next then the funnel 60, it will be noted that the same is pinned for pivotal movement about the point 62 and has a diversion flange 63 disposed interiorly thereof.

Since the flow of the liquid is in the direction of the arrow 16, the diversion flange 63 will normally insure that the liquid passes directly through the funnel into the tube 11.

The funnel 60, however, can be tilted away from the solid line position of FIG. 1 by means of a linkage 50 which will now be described.

The linkage 50 consists of a clevis pin assembly 51 which is secured to the side of the funnel 60. A yoke 52 is secured to the assembly 51 with the yoke 52 also being secured to a rod 53. A turnbuckle 54 is provided for adjusting tension.

The linkage also includes a second yoke 55 pivotally pinned at 56 to rod 58 which extends at right angles to the yoke 55 and is mounted on a pivot arm 59 which is pinned to brace 23. A spring 57 interconnects brace 23 and arm 58 for purposes which will also be described shortly.

The cams 31,31 31 which are carried on plate 30 are adapted to contact the end of the arm 58 raising the arm which pivots on pivot arm 59 thereby raising the outboard end of arm 58 and pulling the linkage 50 downwardly. This, in turn, tilts the funnel 60 causing the diversion flange 63 to close off the opening leading to the tube 11 and diverting liquid flow into the flexible tubing 22.

The cams are sized so that the funnel 60 will be held in this position for a time sufficient to enable the jar 20 to be filled. As the table 30 continues to rotate, of course the cam will pass out from under the arm 58 and the spring 53 will cause the linkage 50 to return to its full line position and once more flow will pass from conduit 13 directly through the tube 11.

A limit switch 34 is provided mounted on the base 15 by means of support 35. The disc 30 has a pin 37 projecting therefrom and when a complete revolution of the disc has occurred, the pin 37 will contact the switch 34 thereby stopping the motor M since at this point all of the bottles 20,20 will be filled.

When it is desired to remove the bottles for testing purposes, it is merely necessary to grasp the arm 26 and move the flexible tubing 22 out the way so that the bottle 20 can be lifted out of the support 21. It is apparent from FIG. 1 that arm 26 will pivot about point 27 and also that the arm 26 and the tubing 22 can return to the position shown in FIG. 1 due to the action of spring 25 which interconnects arm 26 and support 24.

In this fashion individual samples at predetermined time intervals can be obtained.

Considering next then the composite sampling device, it will be noted that the conduit 81 has a branch leading to a second tube 70. A funnel 72 is mounted on the tube 70 and is similar in construction to the funnel 60 having a diversion flange 72a and being pivotal about the point 77.

This sampler, however, utilizes a pull rod 71 attached to the funnel and this rod is operated by a solenoid 75 which is received within the housing 76.

A sampling switch (not shown) of conventional construction is placed in the conduit and once a certain amount by volume of liquid passes through the conduit, this switch activates the solenoid 75 which in turn pulls the pull rod 71 downwardly. This causes tipping of the funnel 72 and the flow is diverted into the tubing 73 and on into the jar 74 in much the same fashion as previously described with regard to funnel 60 and jar 20.

Once another predetermined volume of liquid has passed through the conduit, the switch inactivates the solenoid and the spring 78, which interconnects tube 70 and funnel 60, causes the funnel to be returned to its full line position at which time flow will once more bypass the sampler and pass straight through the tube 70.

It has been shown therefore how a simple, yet effective sampling device can be provided which will enable the taking of both a composite sample proportional to the total flow and individual samples at predetermined times during the operation of the device.

A single pump operates both devices and the device is fully automatic in operation.

While a full and complete description of the invention has been set forth in accordance with the dictates of the patent statutes, it should be understood that modifications can be resorted to without departing from the spirit hereof or the scope of the appended claims.

We claim:

1. A sampling device for obtaining samples of liquid from a liquid supply source, comprising;
    A. a pump;
    B. an inlet conduit system interconnecting said pump and said supply source;
    C. an outlet conduit system interconnecting said pump and said supply source; and
    D. a first sampler interposed in said outlet conduit system between said pump and said supply source and comprising
        1. a normally open tube which permits the free flow of liquid through said system
        2. a plurality of sample receiving containers disposed about said tube
        3. means for rotating said containers about the axis of said tube
        4. funnel means tiltably carried by said tube
        5. first actuating means adapted to tilt said funnel means to divert liquid into said containers at predetermined intervals for measured periods of time.

2. The device of claim 1, further characterized by the presence of a second sampler interposed in said outlet conduit system between said pump and said supply source, comprising;
    A. a normally open tube which permits the free flow of liquid within said system;
    B. a sample receiving container;
    C. funnel means tiltably carried by said tube;
    D. second actuating means adapted to tilt said funnel means to divert liquid into said container in response to the flow of a predetermined volume of liquid passing through said system.

3. The device of claim 1 further characterized by the fact that
    A. said funnel means are pivotally mounted on said tube and normally disposed in alignment with the longitudinal axis of said tube;
    B. said first actuating means including
        1. cam and lever means connected to said funnel means and adapted to pivot said funnel means out of alignment with the axis of said tube.

4. A sampling device for obtaining samples of liquid of the character described, comprising;
    A. a pump;
    B. an inlet conduit system interconnecting a source of liquid supply and said pump;
    C. an outlet conduit system interconnecting said pump and said source of liquid supply;
    D. a first sampler positioned between said pump and said source of liquid supply within said outlet conduit system;
    E. first actuating means adapted to activate said first sampler at timed intervals
        1. whereby discrete samples of liquid can be obtained;
    F. a second sampler positioned between said pump and said source of liquid supply within said outlet conduit system;
    G. second actuating means adapted to activate said second sampler at intervals in response to the volume of liquid passing through said system;
    H. said second sampler including a tube
        1. interposed within said outlet conduit system
        2. and being normally open to permit the free flow of liquid through said system;
    I. a sample receiving container disposed adjacent said tube; and
    J. funnel means carried by said tube and adapted to divert liquid flow from said tube to said container upon actuation of said second actuating means.

5. The device of claim 4 further characterized by the fact that
    A. said funnel means are pivotally mounted on said tube and normally disposed in alignment with the longitudinal axis of said tube;
    B. said second actuating means including
        1. a link arm connected to said funnel means
        2. a solenoid adapted to engage said link arm
            a. whereby said funnel means can be tilted out of alignment with the axis of said tube.

6. A sampling device for obtaining samples of liquid of the character described, comprising;
    A. a source of liquid supply;
    B. a pump connected to said source of liquid supply;
    C. a first tube;
    D. a supply conduit interconnecting said pump and said first tube;

E. an outlet conduit interconnecting said first tube and said source of liquid supply;
F. a turntable mounted for rotation about the axis of said first tube;
G. drive means adapted to rotate said turntable;
H. a plurality of first sample receiving containers mounted on said turntable;
I. a first funnel pivotally mounted adjacent the top of said tube and normally being aligned with the axis thereof;
J. a plurality of cams carried on said turntable;
K. link means connected to said funnel and adapted to engage said cams and tilt said funnel out of alignment with the axis of said tube at predetermined intervals for predetermined periods of time
   1. whereby said liquid may be diverted into one of said sample receiving containers.
7. The device of claim 6 further characterized by the presence of A. a second cylindrical tube;
B. said supply conduit interconnecting said pump and said second tube;
C. an outlet conduit connecting said second tube and said source of liquid supply;
D. a second sample receiving container mounted adjacent said second tube;
E. a second funnel pivotally mounted adjacent the top of said second tube and normally being aligned with the axis thereof;
F. link means connected to said funnel; and
G. switching means adapted to engage said link means and pivot said funnel out of alignment with the axis of said tube
   1. whereby said fluid flow may be diverted into said second sample receiving container.